US009551239B2

(12) United States Patent
Byrne et al.

(10) Patent No.: US 9,551,239 B2
(45) Date of Patent: Jan. 24, 2017

(54) EXHAUST ASSEMBLY CENTER BODY

(71) Applicant: Rohr, Inc., Chula Vista, CA (US)

(72) Inventors: Stuart James Byrne, San Diego, CA (US); Mac Patrick Delaney, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 2 days.

(21) Appl. No.: 14/693,114

(22) Filed: Apr. 22, 2015

(65) Prior Publication Data

US 2016/0312662 A1    Oct. 27, 2016

(51) Int. Cl.
| F01D 25/30 | (2006.01) |
| F02K 1/04 | (2006.01) |
| F02K 1/44 | (2006.01) |
| F01D 25/00 | (2006.01) |
| F02K 1/00 | (2006.01) |

(52) U.S. Cl.
CPC .............. F01D 25/30 (2013.01); F02K 1/04 (2013.01); F02K 1/44 (2013.01); F05D 2220/32 (2013.01); F05D 2260/96 (2013.01); F05D 2300/177 (2013.01); F05D 2300/5021 (2013.01); F05D 2300/6033 (2013.01)

(58) Field of Classification Search
CPC ............ F01D 25/30; F02K 1/04; F02K 1/827; F05D 2220/32; F05D 2260/96; F05D 2300/5021; F05D 2300/6033
USPC ................................... 181/213, 215
See application file for complete search history.

(56) References Cited

U.S. PATENT DOCUMENTS

| 4,044,555 A * | 8/1977 | McLoughlin | F02K 1/825 239/127.3 |
| 4,137,992 A * | 2/1979 | Herman | F02K 1/827 181/213 |
| 4,238,092 A * | 12/1980 | Brennan | F02K 1/00 244/54 |
| 5,127,602 A * | 7/1992 | Batey | B64D 33/06 181/213 |
| 6,935,834 B2 * | 8/2005 | Lata Perez | F02C 7/24 415/115 |
| 7,367,424 B2 * | 5/2008 | Brown | B64D 41/00 181/249 |
| 7,677,026 B2 * | 3/2010 | Conete | F02K 1/48 181/220 |
| 7,784,283 B2 * | 8/2010 | Yu | F02K 1/04 181/213 |
| 7,866,162 B2 * | 1/2011 | Blanchard | F02K 1/04 239/265.11 |

(Continued)

FOREIGN PATENT DOCUMENTS

FR    2992353 A1 * 12/2013  ............ F01D 25/24

*Primary Examiner* — Edgardo San Martin
(74) *Attorney, Agent, or Firm* — Snell & Wilmer L.L.P.

(57) ABSTRACT

In various embodiments, center body assemblies are described herein. The center body assembly may include an attachment ring, a center body, and a cavity structure. The center body may be configured to be coupled to the attachment ring. The cavity structure may be configured to be coupled to the attachment ring. The cavity structure may be configured to be separated from the center body by a gap. The center body and the cavity structure may be configured to expand independently of each other in response to an increase in temperature. In various embodiments, the cavity structure may comprise a baffle. In various embodiments, the center body may comprise a baffle.

19 Claims, 5 Drawing Sheets

(56) References Cited

U.S. PATENT DOCUMENTS

| | | | | |
|---|---|---|---|---|
| 8,025,122 B2* | 9/2011 | Gilcreest | ................... | F01N 1/02 |
| | | | | 181/213 |
| 8,479,877 B2* | 7/2013 | Todorovic | ................. | F02K 1/04 |
| | | | | 181/213 |
| 8,776,946 B2* | 7/2014 | Todorovic | ............... | F01D 25/30 |
| | | | | 181/213 |
| 8,826,669 B2* | 9/2014 | Bouchard | ............... | F02K 1/827 |
| | | | | 181/213 |
| 9,169,937 B2* | 10/2015 | Avdjian | ................ | F16K 15/028 |
| 9,261,008 B2* | 2/2016 | Mecuson | ................ | F01D 25/30 |
| 2004/0056151 A1* | 3/2004 | DiChiara, Jr. | ............ | B64C 5/00 |
| | | | | 244/117 R |
| 2015/0083822 A1* | 3/2015 | Mecuson | .............. | F01D 25/162 |
| | | | | 239/265.11 |
| 2016/0131083 A1* | 5/2016 | Lu | ......................... | F01D 25/243 |
| | | | | 239/265.11 |

* cited by examiner

EXHAUST ASSEMBLY CENTER BODY

FIELD

The present disclosure relates to turbine engine systems and, more specifically, to turbine engine exhaust assembly center bodies.

BACKGROUND

Turbine engine exhaust assemblies, e.g. for commercial airliners, form a nozzle for the high temperature exhaust air of the engine to generate thrust. Exhaust assemblies typically include a center body surrounded by an annular nozzle. The engine exhaust stream exits the engine's turbine stage through an annular passageway. The center body and the annular nozzle form an annular passageway between which conforms to the annular exhaust stream from the engine.

Exhaust center bodies are subject to the extreme heat of the exhaust stream. As the maximum temperatures of exhaust streams are trending higher, ceramic matrix composite (CMC) materials and other high temperature capability materials have been proposed as materials for forming exhaust assemblies. However, new designs for center bodies may be necessary or helpful in order to facilitate the use of materials such as CMCs, especially if the CMC is only used for a portion of the center body and differences in coefficients of thermal expansion exist between the dissimilar materials.

SUMMARY

In various embodiments, center body assemblies are described herein. A center body assembly is provided comprising an attachment ring, a center body, the center body configured to be coupled to the attachment ring, and a floating cavity structure (FCS), the FCS being configured to be coupled to the attachment ring and configured to be separated from the center body by a gap, wherein the center body has a first coefficient of thermal expansion and the FCS has a second coefficient of thermal expansion, the first coefficient of thermal expansion being different from the second coefficient of thermal expansion.

A center body assembly is provided comprising an attachment ring, a center body, the center body configured to be coupled to the attachment ring, and a floating cavity structure (FCS), the FCS being configured to be coupled to the attachment ring and being configured to be separated from the center body by a gap, wherein the center body comprises a baffle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
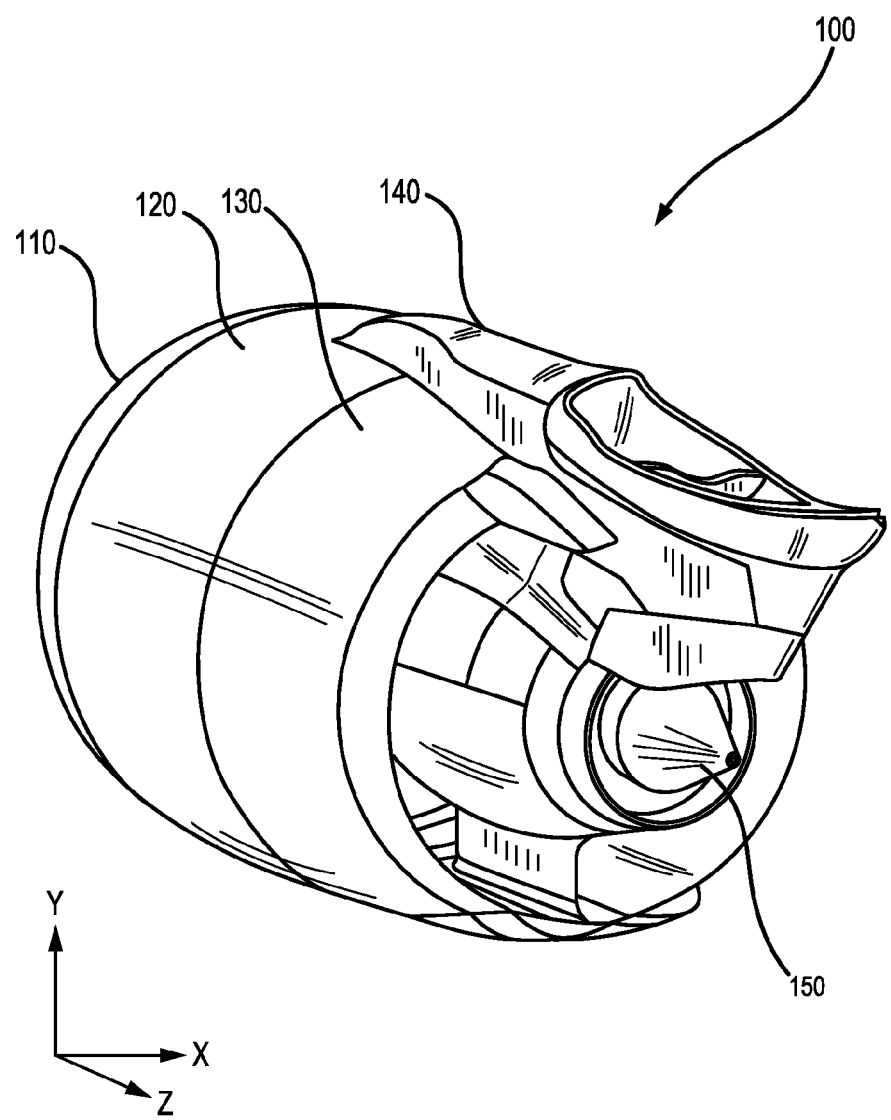
FIG. 1 illustrates a perspective view of a nacelle in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

A ceramic matrix composite ("CMC") center body may be positioned around attachment ring made of a dissimilar material, such as an austenitic nickel-chromium-based superalloy. The CMC center body may have a reduced weight and improved thermal properties as compared to center bodies comprised of one or more metals. The attachment ring may have a greater coefficient of thermal expansion (CTE) than the center body. A plurality of bolts may be inserted through apertures in the center body and coupled to the attachment ring. The bolts may slide within the apertures, allowing the attachment ring to expand without applying a load on the center body.

An internal floating cavity structure or floating cavity structure (FCS) may be located radially inward of the center body. The FCS may be attached to the attachment ring. The attachment ring may have a CTE approximately equal to the FCS. The FCS may at least partially define acoustic chambers within the center body to provide acoustic attenuation during engine operation. The FCS may be separated from the center body by a gap. It may be desirable that the FCS not be fastened directly to the center body in order to avoid unwanted loads caused by different CTEs and/or different temperatures.

Hot gases ejected from a turbine engine may cause the FCS and center body to expand, and this expansion may occur at different rates due to the difference in CTE. For example, two components comprising different CTEs may expand and/or contract at different rates due to a difference in CTE between the two components. Furthermore, hot gases ejected from a turbine engine may comprise thermal gradients which may cause the FCS and center body to expand, and this expansion may occur at different rates due to a difference in temperatures. For example, two components comprising similar CTEs may expand and/or contract at different rates due to thermal gradients across the two components. Accordingly, various components of exhaust systems may experience differential thermal growth due to different CTEs and/or different temperatures. Accordingly, differential thermal growth may be used herein to describe the differential growth of two or more components due to thermal gradients and/or different CTEs. Thermal loads may be introduced between various components due to different CTEs and/or thermal gradients.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Nacelle 100 may further comprise a center body 150. Hot gas from a gas turbine engine may exit the gas turbine engine around center body 150. The center body 150 may be coupled to the gas turbine engine via an attachment ring.

Figure 2A:
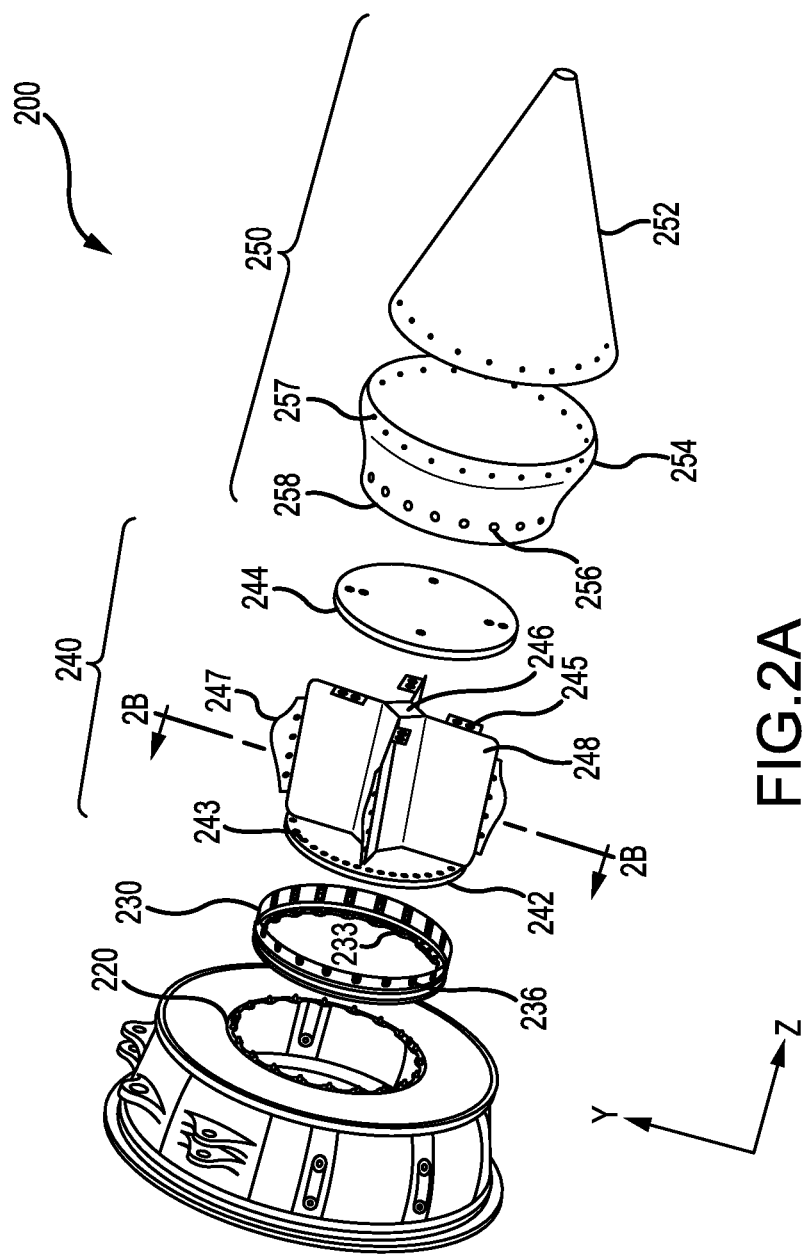
FIG. 2A illustrates an exploded view of an exemplary center body assembly in accordance with various embodiments.

Referring to FIG. 2A, an exploded view of an exemplary center body assembly is illustrated in accordance with various embodiments. Center body assembly 200 may couple to engine flange 220 via attachment ring 230. FCS 240 may likewise be coupled to attachment ring 230. Attachment ring 230 may have a CTE approximately equal to the CTE of FCS 240. FCS 240 may be located radially inward of center body 250. According to various embodiments, FCS 240 may comprise a forward circular plate 242, a core 246, an aft circular plate 244, a plurality of baffles 248, and a plurality of angle brackets 245. Angle brackets 245 may be configured to couple aft circular plate 244 to FCS 240. In various embodiments, the plurality of baffles 248 comprises four baffles, though in further embodiments, the plurality of baffles 248 may comprise at least two baffles. According to various embodiments, core 246 may be integral to plurality of baffles 248, though in various embodiments core 246 may be fastened to plurality of baffles 248 via one or more suitable fasteners.

In various embodiments, FCS 240 and attachment ring 230 may be configured to be coupled together via apertures 243 and apertures 233, respectively, using one or more suitable fasteners. In various embodiments, one or more fasteners may be inserted through apertures 243 of FCS 240 and through apertures 233 of attachment ring 230.

According to various embodiments, center body 250 may be coupled to attachment ring 230 using one or more suitable fasteners. Attachment ring 230 may have a greater CTE than center body 250. Attachment ring 230 and center body 250 may experience differential thermal growth. A plurality of bolts may be inserted through apertures 256 in center body 250 and coupled to attachment ring 230 via apertures 236. The bolts may slide within apertures 236, allowing the attachment ring 230 to expand without applying a load on center body 250. FCS 240 may expand and contract without applying a load on center body 250. Accordingly, center body 250 and FCS 240 may be independently coupled to attachment ring 230. According to various embodiments, center body 250 may comprise an aft center body portion 252 and a forward center body portion 254. Aft center body portion 252 may be located aft (in the positive z-direction) of forward center body portion 254. Aft center body portion 252 and forward center body portion 254 may be complementary to the installation process of center body assembly 200.

According to various embodiments, a plurality of seals 247 may be attached to FCS 240. Seals 247 may be configured to allow center body 250 and FCS 240 to expand and contract without applying significant loads between center body 250 and FCS 240. Seals 247 may be configured to be detachable from FCS 240. For example, during the installation process of center body assembly 200 to an engine, one may first slide forward center body portion 254 over FCS 240 before attaching seals 247. It may not be possible to slide forward center body portion 254 over FCS 240 with seals 247 attached to FCS 240 if the diameter of center body base 258 is less than the maximum diameter of FCS 240 including the seals 247 in the installed position. After FCS 240 and forward center body portion 254 have been attached to attachment ring 230 and the seals have been attached to FCS 240, aft circular plate 244 may be coupled to plurality of baffles 248 via angle brackets 245. Finally, aft center body portion 252 may be coupled to forward center body portion 254.

According to various embodiments, seal 247 may comprise a curved piece of relatively elastic material, for example, a metal having relatively elastic properties. In other embodiments, seal 247 may be relatively stiff. In various embodiments, the seal 247 comprises an austenitic nickel-chromium-based alloy. Seal 247 may be configured to bridge the gap between baffles 248 which extend a certain radius from the center line of the FCS 240, and the inside surface of forward center body portion 254, which is located a further radius from the same center, in order to seal acoustically one acoustic chamber from the adjacent chambers.

Figure 2B:
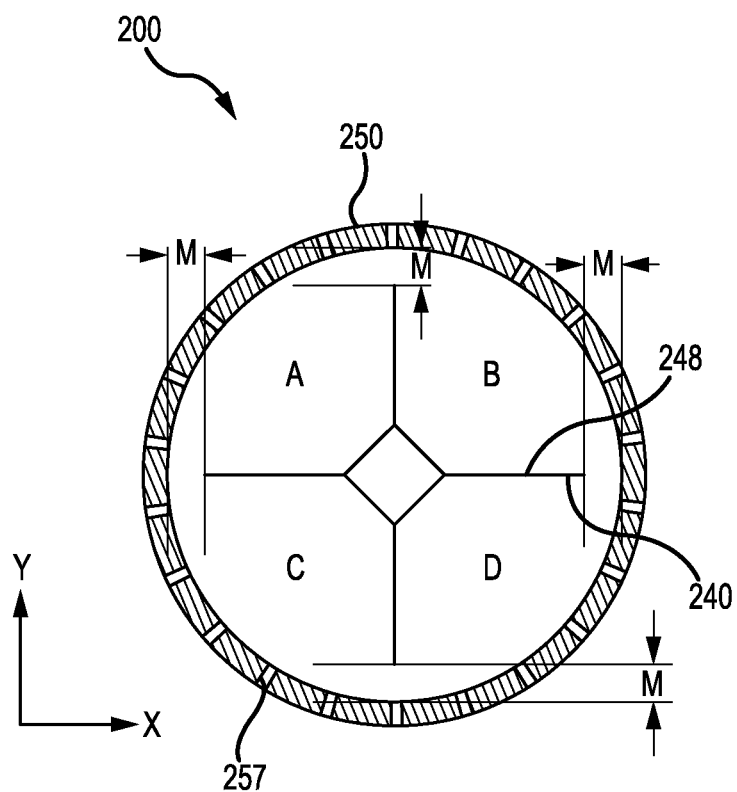
FIG. 2B illustrates a cross sectional view of an exemplary center body assembly in accordance with various embodiments.

With further reference to FIG. 2B, a cross sectional view of center body assembly 200 is illustrated in accordance with various embodiments. The cross-sectional view of center body assembly 200 in the installed position is taken at a location between forward of circular plate 242 and aft circular plate 244. Center body 250 and baffles 248 of FCS 240 may be configured to be separated by gap "M". FCS 240 may have a greater CTE than center body 250. FCS 240 and center body 250 may experience differential thermal growth. Accordingly, FCS 240 may expand more than center body 250 in response to an increase in temperature. Gap "M" may be configured to allow center body 250 and FCS 240 to expand independently of each other. Having center body 250 and FCS 240 configured to be separated by gap "M" may eliminate load paths between center body 250 and FCS 240. Accordingly, a load path may not exist between center body 250 and FCS 240. In various embodiments, during thermal expansion of center body 250 and FCS 240, gap "M" may be configured to decrease. In various embodiments, gap "M" may decrease in response to an increase in temperature. In various embodiments, gap "M" may increase in response to a decrease in temperature. In various embodiments, a plurality of seals 247 may occupy at least a portion of gap "M," and ideally would occupy approximately the entire gap M when the components have undergone thermal growth and are at cruise condition temperatures.

In accordance with various embodiments, FCS 240 and center body 250 may at least partially define a plurality of acoustic chambers. In various embodiments, FCS 240 and center body 250 partially define acoustic chambers A, B, C, and D according to various embodiments. As illustrated, center body assembly 200 comprises four acoustic chambers. According to various embodiments, center body assembly 200 may comprise at least two acoustic chambers. According to various embodiments, the number of acoustic chambers may be defined by the number in the plurality of baffles 248. For example, if there are four baffles, there may be four acoustic chambers at least partially defined by the four baffles.

According to various embodiments, center body 250 may include a plurality of apertures 257. Apertures 257 may be configured to allow acoustic waves to enter into center body 250. Apertures 257 may aide in acoustic mitigation of exhaust noise.

According to various embodiments, acoustic chambers A, B, C, and D may help attenuate exhaust noise, especially very low frequency acoustic noise. According to various embodiments, acoustic chambers A, B, C, and D may act similar to a Helmholtz resonator. Acoustic waves may enter center body 250 through apertures 257 into at least one of acoustic chamber A, B, C, and D. Acoustic waves may be reflected by at least a portion of acoustic chamber A, B, C, and D in a manner such that the reflected acoustic wave interferes with an entering acoustic wave, mitigating the acoustic signature of the exhaust noise. Center body assembly 200 may be configured to mitigate acoustic waves comprising relatively low frequencies such as frequencies of around 450 Hertz, for example. Acoustic chambers A, B, C, and D may be further subdivided by additional perforated baffles (not shown) in what may be referred to as a folding cavity design.

Figure 3A:
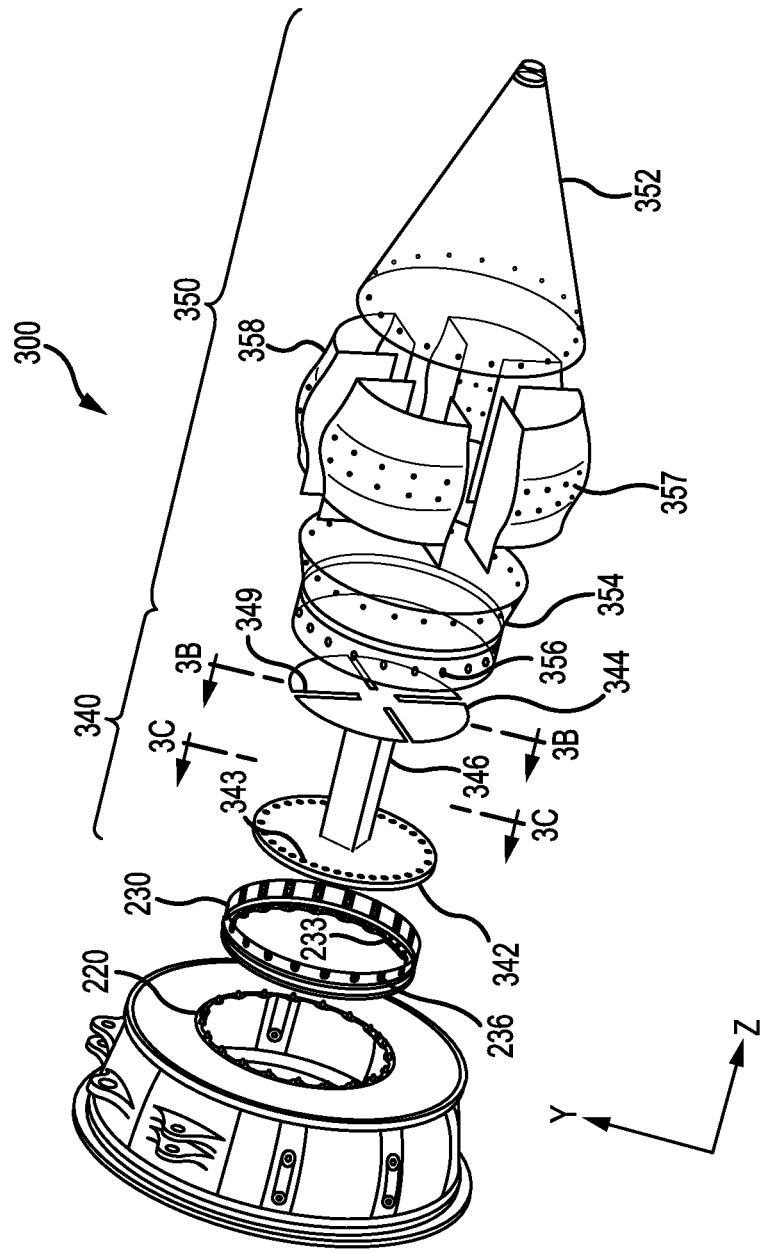
FIG. 3A illustrates an exploded view of an exemplary center body assembly in accordance with various embodiments.

Referring to FIG. 3A, an exploded view of an exemplary center body assembly 300 is illustrated in accordance with various embodiments. Similar to center body assembly 200 of FIG. 2, center body assembly 300 may include an engine flange 220 and an attachment ring 230. Center body assembly 300 may further include FCS 340 and a center body 350 in accordance with various embodiments. Similar to center body assembly 200 of FIG. 2, a plurality of fasteners may be inserted through apertures 343 of FCS 340 and through apertures 233 of attachment ring 230 to couple FCS 340 to attachment ring 230. FCS 340 may comprise a forward circular plate 342, a core 346, and an aft circular plate 344. Core 346 may extend from forward circular plate 342 to aft circular plate 344. Accordingly, forward circular plate 342 and aft circular plate 344 may be separated by core 346. Core 346, forward circular plate 342, and aft circular plate 344 may be integral to one another. In various embodiments, core 346, forward circular plate 342, and aft circular plate 344 may be coupled via one or more suitable fasteners. Aft circular plate 344 may comprise a plurality of slots 349 extending in the radial direction. The number of slots 349 may be equal to the number of baffles in plurality of baffles 348.

According to various embodiments, center body 350 may comprise an aft center body portion 352 and a forward center body portion 354. Center body 350 may be coupled to attachment ring 230 in the same manner as center body 250 of center body assembly 200 as illustrated by FIG. 2A. Accordingly, center body 350 may be coupled to attachment ring 230 via apertures 356 and apertures 236 in the same manner as previously mentioned. Aft center body portion 352 may be located aft (in the positive z-direction) of forward center body portion 354. Center body 350 may further comprise a plurality of baffles 358. Aft center body portion 352 and forward center body portion 354 may be complimentary to the manufacturing process of center body 350 and baffles 358. The plurality of baffles 358 and center body 350 may be heat treated together as part of a CMC manufacturing process. Accordingly, the plurality of baffles 358 may be integral to center body 350. Center body 350, together with baffles 358 may be configured to slide over FCS 340. The baffles may be configured to at least partially slide through slots 349 of aft circular plate 344 during installation.

Figure 3B:
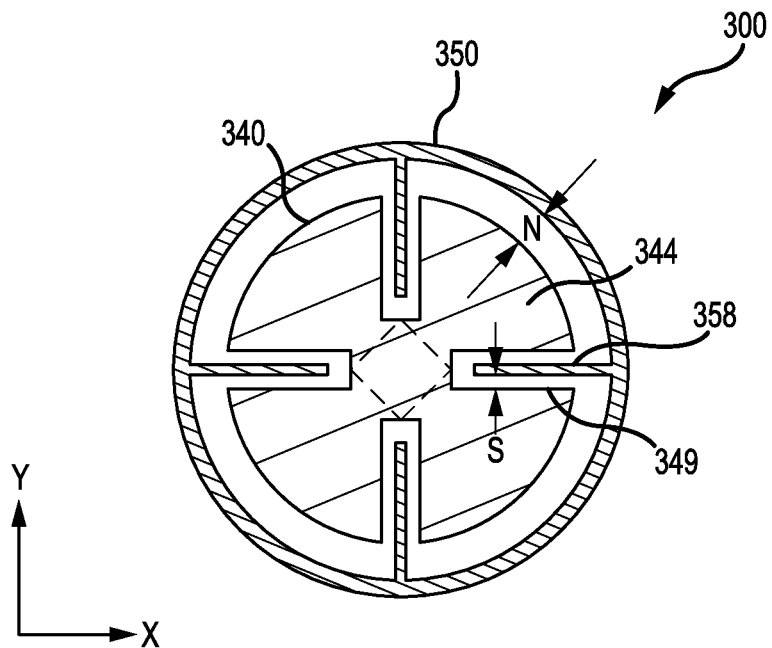
FIG. 3B illustrates a cross sectional view of an exemplary center body assembly in accordance with various embodiments.

Referring to FIG. 3B, a cross sectional view of center body assembly 300 is illustrated. The cross-sectional view of center body assembly 300 in the installed position is taken at the location of aft circular plate 344. During installation, plurality of baffles 358 are slid into slots 349 of aft circular plate 344. According to various embodiments, plurality of baffles 358 and aft circular plate 344 are configured to be separated by a gap "S". According to various embodiments, center body 350 and aft circular plate 344 may be configured to be separated by gap "N". FCS 340 may have a greater CTE than center body 350. FCS 340 and center body 350 may experience differential thermal growth. Accordingly, FCS 340 may expand more than center body 350 in response to an increase in temperature. Gap "N" and gap "S" may be configured to allow center body 350 and FCS 340 to expand independently of each other. Having center body 350 and FCS 340 configured to be separated by gap "N" and gap "S" may eliminate load paths between center body 350 and FCS 340. Accordingly, a load path may not exist between center body 350 and FCS 340. In various embodiments, during thermal expansion of center body 350 and FCS 340, gap "N" and gap "S" may be configured to decrease. In various embodiments, gap "N" and gap "S" may decrease in response to an increase in temperature. In various embodiments, gap "N" and gap "S" may increase in response to a decrease in temperature. According to various embodiments, the width of gap "N" and the width of gap "S" may be equal. According to various embodiments, the width of gap "N" may be greater than the width of gap "S". According to various embodiments, the width of gap "N" may be less than the width of gap "S".

Figure 3C:
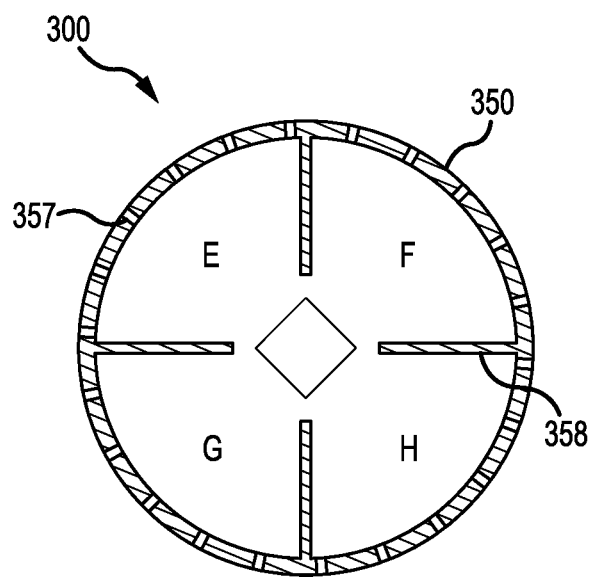
FIG. 3C illustrates a cross sectional view of an exemplary center body assembly in accordance with various embodiments.

With reference to FIG. 3C, a cross sectional view of center body assembly 300 is illustrated. The cross-sectional view of center body assembly 300 in the installed position is taken at a location between forward circular plate 342 and aft circular plate 344. According to various embodiments, Center body 350 and FCS 340 may at least partially define a plurality of acoustic chambers E, F, G, and H. In various embodiments, center body assembly 300 comprises four acoustic chambers. According to various embodiments, center body assembly 300 may comprise at least two acoustic chambers. According to various embodiments, the number of acoustic chambers may be defined by the number of baffles in plurality of baffles 358. For example, if there are four baffles there may be four acoustic chambers at least partially defined by the four baffles.

According to various embodiments, center body 350 may include a plurality of apertures 357. Apertures 357 may be configured to allow acoustic waves to enter into center body 350. Apertures 357 may aide in acoustic mitigation of exhaust noise.

According to various embodiments, acoustic chambers E, F, G, and H may help attenuate exhaust noise. According to various embodiments, acoustic chambers E, F, G, and H may act as a Helmholtz resonator. Acoustic waves may enter center body 350 through apertures 357 into at least one of acoustic chamber E, F, G, and H. Acoustic waves may be reflected by at least a portion of acoustic chamber E, F, G, or H in a manner such that the reflected acoustic wave interferes with an entering acoustic wave, mitigating the acoustic signature of the exhaust. Center body assembly 300 may be configured to mitigate acoustic waves comprising relatively low frequencies such as frequencies of around 450 Hertz, for example.

With reference to FIG. 2A and FIG. 3A, core 246, 346 may be any geometric shape including, for example, round, triangular, square, and pentagonal, in accordance with various embodiments. According to various embodiments, the size of core 246 may at least partially define the size of acoustic chambers A, B, C, and/or D. According to various embodiments, the size of core 346 may at least partially define the size of acoustic chambers E, F, G, and/or H. For example, if the diameter of core 246 increased, the depth of acoustic chambers A, B, C, and/or D may decrease. In various embodiments, the size of core 246 and acoustic chambers A, B, C, and D may affect the mitigation of exhaust acoustics. In various embodiments, the size of core 346 and acoustic chambers E, F, G, and H may affect the mitigation of exhaust acoustics.

In various embodiments, the attachment ring 230 may comprise a CTE greater than the CTE of the center body 250, 350. In various embodiments, the center body attachment ring 230 and/or baffles 258, 358 may comprise an austenitic nickel-chromium-based alloy such as Inconel®, which is available from Special Metals Corporation of New Hartford, N.Y., USA. However, the center body attachment ring 230 and/or plurality of baffles 258, 358 may comprise a variety of nickel and chromium based alloys, such as Inconel® MA754, an oxide dispersion strengthened nickel-chromium super alloy; René 41, a nickel-cobalt high temperature alloy; Haynes® 244, a nickel-cobalt alloy manufactured by Haynes International, Inc.; or Haynes® 282, a wrought gamma-prime strengthened superalloy manufactured by Haynes International, Inc. The center body assembly 200, 300 may be subject to operating environments that experience a wide range of temperatures, such as from 0° F. to 1,400° F. (−20° C. to 760° C.). The center body attachment ring 230 may expand more than the center body 250, 350 in response to the same increase in temperature.

In various embodiments, center body assemblies may comprise multiple materials, or any material configuration suitable to enhance or reinforce the resiliency and/or support of the system when subjected to wear in an aircraft operating environment or to satisfy other desired electromagnetic, chemical, physical, or biological properties, for example radar signature, load capacity, and/or heat tolerance.

In various embodiments, various components may comprise a CMC. For example, various aspects of the center body 250, 350 and/or plurality of baffles 258, 358 may comprise a CMC. However, in various embodiments, the center body 250, 350 and/or baffles 258, 358 may comprise at least one of a carbon-carbon composite, a ceramic material, graphite, or any other suitable material. Thus, as discussed herein, the center body 250, 350 may exhibit a different CTE than the engine flange 220 and the center body attachment ring 230. In various embodiments, a CMC may generally comprise one or more ceramic materials disposed on or within another material, such as, for example, a ceramic material disposed within a structure comprised of a fibrous material. Fibrous materials, such as carbon fiber, aramid fibers, fiberglass fibers, and the like may be formed into fibrous structures suitable for this purpose. Deposition of a ceramic material into or onto a fibrous material may be accomplished using chemical vapor infiltration (CVI), melt infiltration (MI), and slurry casting (SC) may be used, alone or in various combinations, to partially or fully impregnate a fibrous structure with the ceramic material.

While the center body assemblies described herein have been described as including an FCS 240, 340 comprising a metallic material and a center body 250, 350 comprising a CMC, FCS 240, 340 and center body 250, 350 may both comprise a metallic material. Furthermore, FCS 240, 340 and center body 250, 350 may both comprise a CMC. In such embodiments, differential thermal growth may be dominated by the effect of thermal gradients. Furthermore, the materials used for FCS 240, 340, as described herein, and the materials used for center body 250, 350, as described herein, may be interchanged. For example, FCS 240, 340 may comprise a CMC and center body 250, 350 may comprise a metallic material. In such embodiments, differential thermal growth may be dominated by the effect of different material properties such as CTE.

Moreover, the center body 250, 350 may comprise any material suitably lightweight and heat tolerant. In various embodiments, various aspects of the center body 250, 350 and/or baffles 258, 358 may comprise refractory metal, for example, an alloy of titanium, for example titanium-zirconium-molybdenum (TZM).

While the center body assemblies described herein have been described in the context of aircraft applications, one will appreciate in light of the present disclosure that the system described herein may be used in connection with various other vehicles, for example, a launch vehicle, a spacecraft, an unmanned aerial vehicle, a missile, cars, trucks, busses, trains, boats, and submersible vehicles, or any other vehicle or device, or in connection with industrial processes, or propulsion systems, or any other system or process having different materials exposed to fluctuating temperatures.

Additionally, although described primarily with reference to ceramic matrix composite center bodies, the present disclosure may be used with various materials having relatively low CTEs, such as carbon-carbon composites, ceramic materials, and graphite.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A center body assembly comprising:
   an attachment ring;
   a center body, the center body configured to be coupled to a radially outer portion of the attachment ring; and a floating cavity structure (FCS), the FCS being configured to be coupled to a radially inner portion of the attachment ring and configured to be separated from the center body by a gap,
   wherein the center body has a first coefficient of thermal expansion and the FCS has a second coefficient of thermal expansion, the first coefficient of thermal expansion being different from the second coefficient of thermal expansion.

2. The center body assembly of claim 1, wherein the FCS comprises a baffle, the baffle at least partially defining an acoustic chamber within the center body assembly.

3. The center body assembly of claim 2, wherein the center body comprises a surface defining an aperture, the aperture being configured to allow an acoustic wave to enter into the acoustic chamber.

4. The center body assembly of claim 3, wherein the center body comprises an aft portion and a forward portion.

5. The center body assembly of claim 4, wherein the FCS further comprises an angle bracket and an aft circular plate, wherein the aft circular plate and the baffle are configured to be coupled via the angle bracket.

6. The center body assembly of claim 1, wherein the center body comprises a ceramic matrix composite.

7. The center body assembly of claim 1, wherein the first coefficient of thermal expansion center body is less than the second coefficient of thermal expansion.

8. The center body assembly of claim 1, wherein the center body attachment ring is configured to be coupled to an engine flange.

9. The center body assembly of claim 1, wherein the attachment ring comprises an austenitic nickel-chromium-based alloy.

10. A center body assembly comprising:
    an attachment ring,
    a center body, the center body configured to be coupled to the attachment ring; and
    a floating cavity structure (FCS), the FCS being configured to be coupled to the attachment ring and being configured to be separated from the center body by a gap, wherein the FCS comprises a baffle, wherein the baffle is configured to slide through a slotted portion of the FCS during installation.

11. The center body assembly of claim 10, wherein the baffle at least partially defines an acoustic chamber within the center body assembly.

12. The center body assembly of claim 11, wherein the center body comprises an aperture, the aperture being configured to allow an acoustic wave to enter into the acoustic chamber, wherein the acoustic wave is mitigated via at least a portion of the center body assembly.

13. The center body assembly of claim 10, wherein the center body and the baffle are integral, the center body and baffle comprising a ceramic matrix composite.

14. The center body assembly of claim 10, wherein the center body comprises a coefficient of thermal expansion which is less than a coefficient of thermal expansion of the attachment ring.

15. A method comprising:
    positioning a floating cavity structure (FCS) at least partially coaxial to an attachment ring and at least partially radially inward of the attachment ring;
    positioning a forward center body at least partially coaxial to the attachment ring, the forward center body having a forward center body base, at least a portion of the forward center body base being positioned radially outward of the attachment ring, wherein the FCS comprises a seal and a plurality of baffles, wherein the diameter of the forward center body base is less than a maximum diameter of the FCS and the seal;
    attaching an aft circular plate to the plurality of baffles via an angle bracket; and
    coupling an aft center body portion to the forward center body portion.

16. The center body assembly of claim 1, wherein the FCS comprises:
    a forward circular plate, the baffle extending between the forward circular plate and the aft circular plate, wherein the forward circular plate, the aft circular plate, and the baffle at least partially define a first acoustic chamber within the center body assembly.

17. The center body assembly of claim 16, wherein the FCS further comprises a second baffle extending between the forward circular plate and the aft circular plate, a third baffle extending between the forward circular plate and the aft circular plate, and a fourth baffle extending between the forward circular plate and the aft circular plate.

18. The center body assembly of claim 17, wherein the baffle, the second baffle, the third baffle, and the fourth baffle at least partially define four separate acoustic chambers.

19. The center body assembly of claim 2, wherein a seal is coupled to a radially outer portion of the baffle.

* * * * *